United States Patent [19]

Hoang et al.

[11] Patent Number: 5,058,649
[45] Date of Patent: Oct. 22, 1991

[54] PNEUMATIC TIRE COMPRISING A PENTAGONAL BEAD CORE

[75] Inventors: Andy N. Hoang; Keith C. Trares, both of Akron; Jeffrey W. Kahrs, Hartville, all of Ohio

[73] Assignee: The Goodyear Tire & Rubber Company, Akron, Ohio

[21] Appl. No.: 556,596

[22] Filed: Jul. 25, 1990

[51] Int. Cl.$^5$ ............................................. B60C 15/04
[52] U.S. Cl. .................................. 152/540; 152/543; 152/552
[58] Field of Search ............... 152/539, 540, 543, 546, 152/552, 554; 245/1.5

[56] References Cited

U.S. PATENT DOCUMENTS

| | | | |
|---|---|---|---|
| 1,437,013 | 11/1922 | Pratt | 245/1.5 |
| 1,981,893 | 11/1934 | Abbott Jr. | 152/540 |
| 3,038,518 | 6/1962 | Hershey | 152/543 |
| 3,736,973 | 6/1973 | Mezanotte et al. | 152/541 |
| 3,861,442 | 1/1975 | Bertrand | 152/540 |
| 4,029,137 | 6/1977 | Suydam | 152/539 |
| 4,192,368 | 3/1980 | Maiocchi | 152/540 |
| 4,227,563 | 10/1980 | Grosch et al. | 152/547 |
| 4,258,775 | 3/1981 | Samoto | 152/531 |
| 4,261,405 | 4/1981 | Yamauchi et al. | 152/454 |
| 4,436,130 | 3/1984 | Suzuki et al. | 152/525 |
| 4,508,153 | 4/1985 | Tanaka et al. | 152/543 |
| 4,609,023 | 9/1986 | Loser | 152/454 |
| 4,700,764 | 10/1987 | Endo et al. | 152/526 |
| 4,705,091 | 11/1987 | Iuchi | 152/541 |
| 4,811,773 | 3/1989 | Endo et al. | 152/543 |
| 4,854,361 | 8/1989 | Gasowski et al. | 152/552 |
| 4,922,985 | 5/1990 | Gasowski et al. | 152/543 |
| 4,940,069 | 7/1990 | Nakaski et al. | 152/546 |

FOREIGN PATENT DOCUMENTS

| | | |
|---|---|---|
| 0167283 | 1/1986 | European Pat. Off. . |
| 0247422 | 12/1987 | European Pat. Off. . |
| 0251145 | 1/1988 | European Pat. Off. . |
| 3515319 | 10/1986 | Fed. Rep. of Germany . |
| 3522332 | 1/1987 | Fed. Rep. of Germany . |
| 62-4616 | 1/1987 | Japan . |

OTHER PUBLICATIONS

U.S. Appln. 07/557,331 filed 7/25/90 for "Bead Structure for a Pneumatic Tire", Hoang et al.

Primary Examiner—John J. Gallagher
Assistant Examiner—Nancy T. Krawczyk
Attorney, Agent, or Firm—David E. Wheeler; L. R. Drayer

[57] ABSTRACT

The turn-up portion of the carcass ply (12) in the bead portion of a pneumatic tire is interposed between the bead core (11) and a clamping member (18). The bead core (11) has a radial cross section which is substantially pentagonal. The clamping member (18) comprises a heat shrinkable material that secures the turn-up portion of the carcass ply in a desired location. Elastomeric stiffening members (19,20) are disposed on each side of the carcass ply (12) in the bead portions and lower sidewalls of the tire. The assembly of a tire according to the invention mounted upon a specified rim (22) is also disclosed.

20 Claims, 2 Drawing Sheets

PNEUMATIC TIRE COMPRISING A PENTAGONAL BEAD CORE

The present invention relates generally to the bead portion of a pneumatic tire, and more specifically to a tire having a bead portion which contains heat shrinkable material to secure the turn-up portion of a carcass ply, or plies, in a desired location.

The desirability of having the turn-up portions of the carcass ply (or plies) of a pneumatic tire extend radially outwardly of the bead core the shortest possible distance is well recognized in the tire art. These advantages include improved bead durability, and reduced material costs.

The invention may be better understood by referring to the figures of the drawing wherein.

Figures 2, 3:
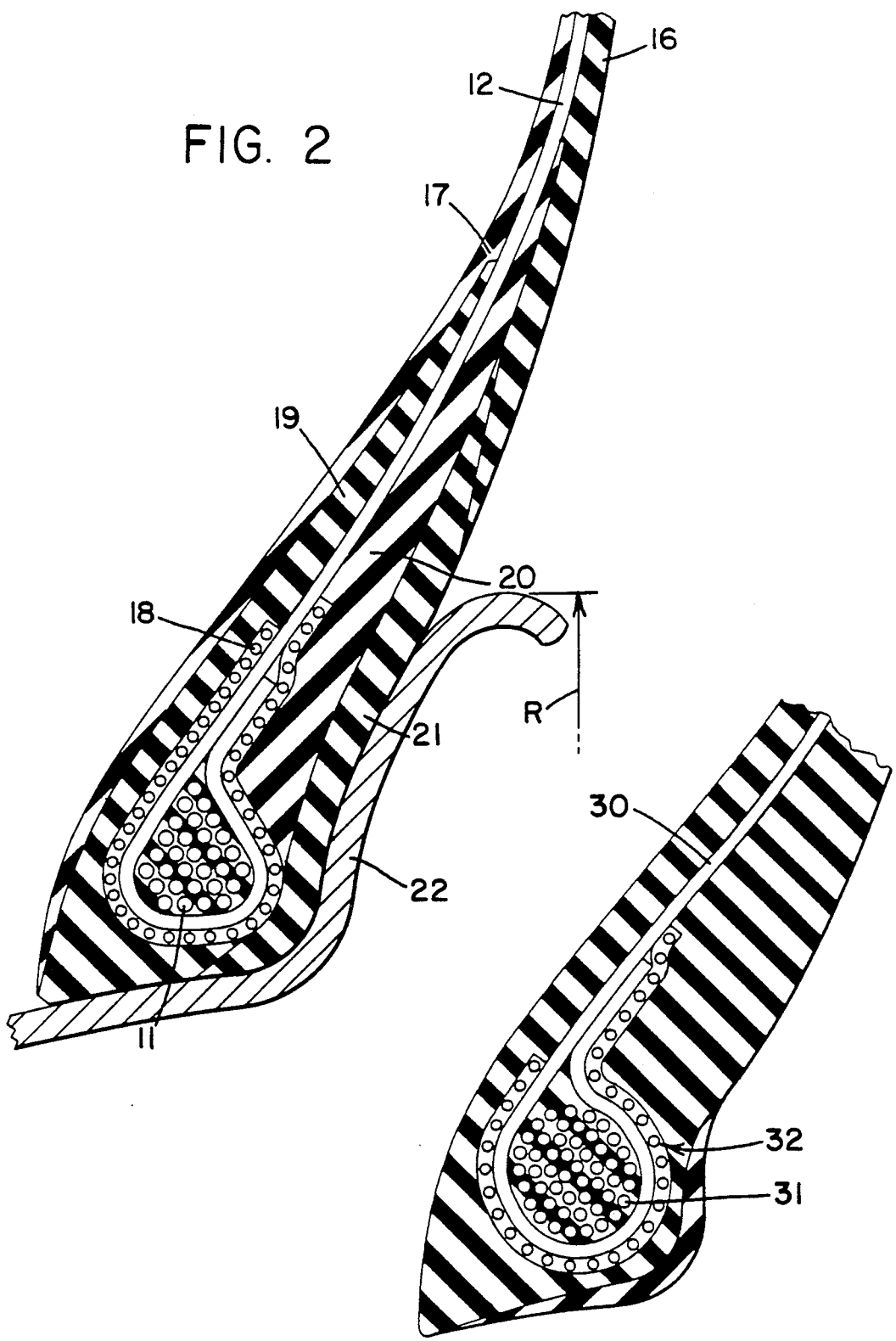
FIG. 2 is a fragmentary cross-sectional view of the bead portion of a tire according to the present invention mounted upon a rim.
FIG. 3 is a cross-sectional view of the bead portion of a tire according to the prior art.

Referring first to FIG. 3 there is shown a bead portion of a prior art tire as taught in commonly owned U.S. Pat. No. 4,922,985, issued May 8, 1990. The carcass ply 30 has a main portion that extends between both bead cores (not shown) of the tire and turn-up portions that are anchored around each bead core 31. The bead core 31 comprises a plurality of wraps of a metallic filament which are not twisted together to form a cable and which have an elastomeric substance interposed between at least some of the wraps for the purpose of insulating the wraps of the metallic filament from one another. A portion of this insulating material has been squeezed from between the filament wraps of the bead core during the tire shaping and molding process and is consequently disposed radially outwardly of the bead core between the main portion and turn-up portion of the carcass ply. In tires according to this prior art embodiment and the present invention the same elastomeric substance which is interposed between the turn-up portion of the carcass ply and the main portion of the carcass ply radially outwardly of the associated bead core as is contained in the bead core itself. The "main portion of the carcass ply" is understood to mean the portion of the carcass ply which extends between the bead cores. It is understood that as used herein and in the claims a carcass ply comprises reinforcing cords embedded in an elastomeric substance and that these components are considered to be a single entity. Tires according to this prior art embodiment and the present invention have the radially outer edges of the turn-up portions of the carcass ply are disposed radially outwardly of the bead cores a minimal distance and are in contact with the main portion of the carcass ply. Suitable elastomeric materials surround the bead core, carcass ply, and other elastomeric components to complete the bead portion of the tire.

As used herein and in the claims the terms "radial" and "radially" refer to directions going towards or away from the axis of rotation of a tire. The terms "axial" and "axially" indicate directions that are parallel to the axis of rotation of a tire.

In tires according to this prior art embodiment and the present invention a turn-up portion of the carcass ply 30 extends radially outwardly of the bead core 31 a minimal distance to allow for some pull-down of the carcass ply during the shaping and curing process, otherwise the turn-up could end up not clamped in place by the bead core 31 and clamping member 32. For example, in a passenger tire the edge of the turn-up portion may be located about 10 mm radially outwardly of the bead core. Of course the exact location of the radially outer edge of the turn-up portion of the carcass ply should be selected in accordance with good engineering practice depending upon the carcass ply material and the cross-sectional shape of the tire.

In the prior art embodiment illustrated in FIG. 3, as well as in a tire and tire and wheel assembly according to the present invention, the clamping member 32 comprises a strip of side-by-side cords of a heat shrinkable material embedded in a suitable elastomeric substance and having a permanent thermal shrinkage of at least 2%. This strip of cords extends circumferentially and extends in contact with the radially innermost carcass ply 30 (or the only carcass ply) from a location radially and axially inward of the bead core 31 to a location radially outward of the bead core and adjacent to the main portion of the carcass ply, and there is no filler strip or apex disposed between the main portion and turn-up portion of the carcass ply. The side-by-side cords in the clamping member strip are preferably oriented at angles in the range of 10° to 45° with respect to a plane perpendicular to the axis of rotation of the tire, but in any case at angles in the range of 0° to 75° with respect to a plane perpendicular to the axis of rotation of the tire. As used herein and in the claims, a "cord" is understood to be either a single filament or a plurality of filaments twisted together with one another to form a cable.

This use of a single component for dual purposes as either a toe guard/clamping member or chafer/clamping member provides not only the aforementioned advantages over the prior art but also provides economical use of materials, labor, and machine time.

Other components that may be located in the bead portion include a toe guard and a chafer strip. A "toe guard" is a layer of reinforcing cords folded around the carcass ply and bead core on the side of the carcass ply furthest away from the bead core. The primary purpose of a toe guard is to protect the bead from damage during mounting of the tire on a rim and subsequent use of the tire on a vehicle. A chafer may be either a tough elastomeric material that protects the bead portion from abrasion during mounting and use of the tire, or a layer of fabric extending from radially inwardly of the bead core to the same radial height as the edge of the turn-up.

As used herein and in the appended claims "permanent thermal shrinkage" is understood to mean the intrinsic dimensional stability of a material when it is exposed to an elevated temperature as indicated by the percentage of permanent shrinkage determined using the following test procedure. In this test procedure a cord is exposed to a temperature of 177° C. and its percentage of shrinkage is measured directly from a calibrated dial in a shrinkage meter, which determines the total shrinkage inherent in the material.

The apparatus used in this test procedure include:

(1) a Testrite Thermal Shrinkage Oven/Meter, Model T.S. 10AB, (or a later model of this same device) manufactured by Testrite, Ltd., Woodfield Works, Old Lane, Halifax, England, HX3 6TF;

(2) a timer; and (3) pretension weights ranging from 8 to 40 grams.

The test procedure is as follows:

1. Connect the shrinkage meter to a suitable means of power supply. Set test temperature at 177° C. on temperature regulator. Allow about 20 minutes for the oven to reach operating temperature—operating temperature is reached when the deviation monitor needle reaches and remains at the zero position of the monitor scale.

2. Cut fabric samples 660 mm in length. Make a loop at one end of each cord so that pretension weights can be hung therefrom.

3. Draw the sliding carriage forward. Secure the other end of the cord sample in the center of the stationary clamp located to the right of the sliding carriage.

4. Place the cord over the take-up drum to the left of the carriage and hang the proper pretension weight on the cord. The pretension weight should be 0.01 grams per denier of the cord. For example, a 1000/3 polyester cord (3 filaments of 1000 denier each) should have a pretension weight of 30 grams.

5. With the sample cord in position in the center of the pickup drum, set pointer to zero.

6. Gently push the carriage assembly with the cord sample forward to the fullest extent into the heated oven. Start timer immediately to record shrinkage.

7. At the end of two minutes read and record percent total shrinkage from the calibrated scale indicated by the pointer.

8. Pull sliding carriage backward to remove sample from heated zone; immediately thereafter start timer. Read and record percent permanent shrinkage after a one minute cooling period from the calibrated scale.

Tires according to the prior art embodiment of FIG. 3 were manufactured using a clamping member in which the heat shrinkable material was 1260/2 Nylon 6,6, having a permanent thermal shrinkage of about 4%. It is understood that other nylon materials, as well as polyester or other heat shrinkable materials having a permanent thermal shrinkage of at least 2% may be employed in the practice of the invention disclosed herein.

Figure 1:
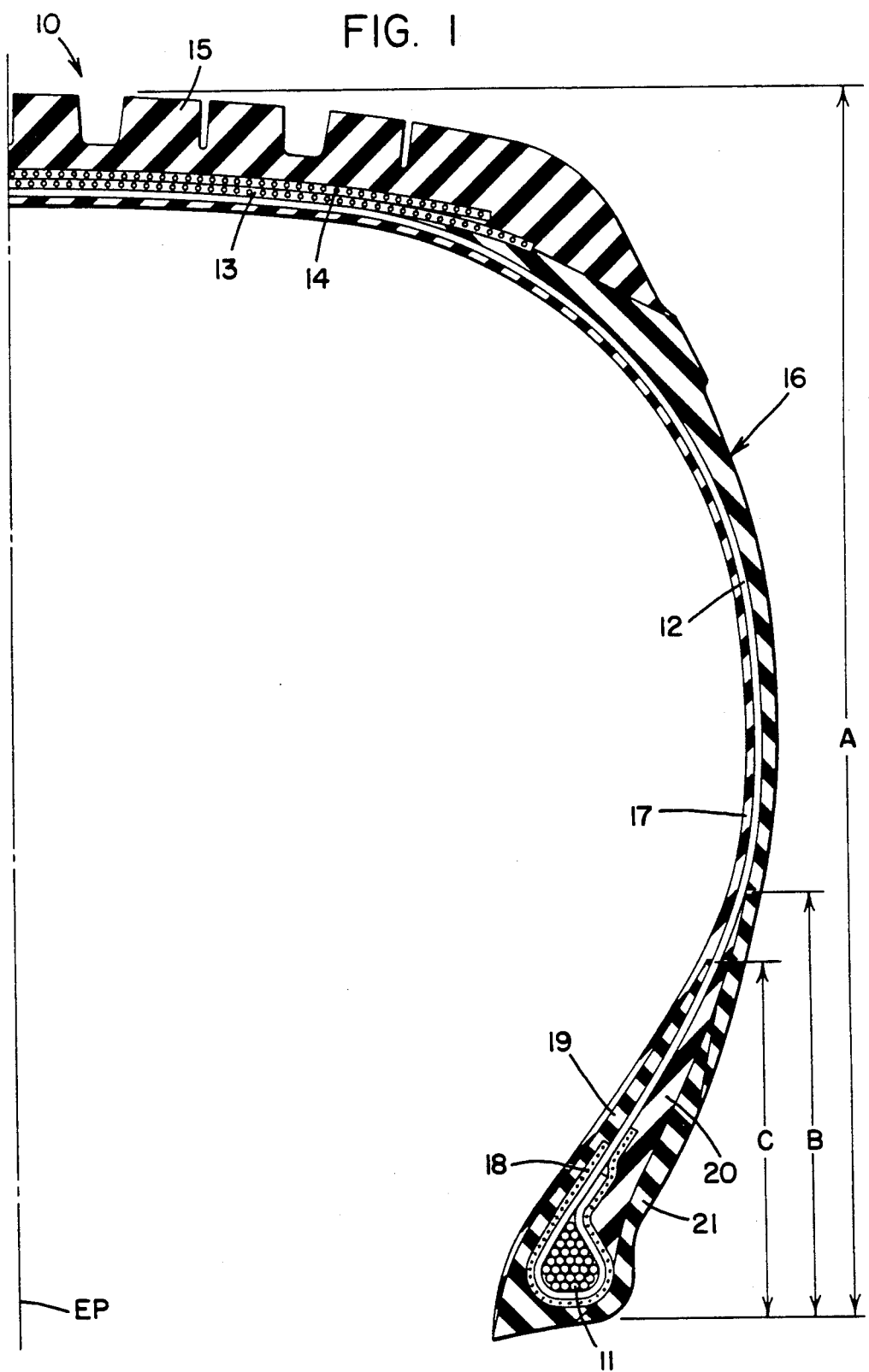
FIG. 1 is a partial cross-sectional view of a tire according to the present invention.

Referring next to FIGS. 1 and 2 there is shown a fragmentary cross-sectional view of a tire 10 according to the present invention and an enlarged fragmentary view of a bead portion and lower sidewall mounted upon a rim. A tire 10 according to the present invention is similar to the prior art tire which has already been described herein, the main improvement in the new tire being the radial cross-sectional shape of the bead cores 11 of the new tire and the addition of elastomeric stiffening members 19,20 on each side of the carcass ply in the lower sidewalls of the tire. A tire according to the present invention has a pair of axially spaced apart bead cores 11 which each comprise a plurality of wraps of a single metallic filament. That is to say, a single continuous metallic filament is wrapped around a mandrel a number of times to obtain the desired cross-sectional configuration of the bead core. Each of the bead cores has a radial cross-sectional shape which is substantially pentagonal with the greatest axial width of the bead core being located radially outwardly of the radially innermost edge of the bead core. If a layer contains more than one wrap of said single filament, the wraps are in a side-by-side relationship. That is to say, the number of wraps of said single filament in each layer progressively increases to a maximum number, and then progressively decreases until the radially outermost layer contains only a single wrap of said filament. As used herein a "radial cross section" is a cross section taken in a plane which contains the axis of rotation of a tire or tire and rim assembly. As used herein and in the claims "substantially pentagonal" is understood to mean a five sided cross section, even though some or all of the sides may be curvilinear rather than rectilinear, as in a regular pentagon. The radially outermost extent of the bead core being the vertex of two of the sides of the pentagon.

The advantage of a bead core having a cross-sectional shape that is substantially pentagonal is to prevent the formation of a void in the area radially outwardly of the bead core which is enclosed by the carcass ply, and to increase the stiffness of the tire structure at this same location. A further advantage of the pentagonal bead is that it tends to maintain its pentagonal shape throughout the tire assembly, shaping and vulcanizing processes. A further advantage is that the strength of the beads comparable number of turns of wire is significantly better for the pentagonal beads.

A carcass ply 12 and a clamping member 18 are folded about each bead core in the same manner as described above with respect to the prior art tire. The carcass ply 12 and clamping member 18 are encased in suitable elastomeric compounds. The cables of the carcass ply 12 are oriented such that the tire according to the invention is what is commonly referred to in the art as a radial ply tire. It is believed to be an important feature of the invention that each turn-up portion of the carcass ply, or plies, and each clamping member are wholly disposed radially inwardly of the specified outermost radius R of a rim 22 which is specified for use with the tire in the YEAR BOOK OF THE TIRE AND RIM ASSOCIATION, INC. for the year in which the tire is manufactured, or in the yearbook of The European Tyre & Rim Technical Organization for the year in which the tire is manufactured. The Tire and Rim Association, Inc. is headquartered at 3200 West Market Street, Akron 44313, U. S. A., and the "YEAR BOOK" contains standards approved by the association for tire designations, dimensions, rim contours and dimensions, and other data and notes necessary for tire/rim interchangeability. The advantage of this particular arrangement of the bead core, carcass ply and clamping member is believed to be desirable because of the good bead durability obtained despite a reduction in the volume and weight of the structure.

A belt structure comprising a plurality of belt plies 13, 14 is located radially outwardly of the carcass ply 12 in a crown portion of the tire. An elastomeric tread portion 15 is disposed radially outwardly of the belt structure.

A tire according to the best mode contemplated for practicing the invention at the time of filing this application may be described with references to FIGS. 1 and 2. For the working example of the best mode a tire of size LT 235/85R16, which is for a pick-up truck, will be described although the best mode may be used with other sizes of tires. A tire according to the best mode has a pair of axially spaced apart bead cores 11 which each comprise a plurality of wraps of a single metallic filament. The metallic filament used in the bead cores of the working example of the best mode was 0.050 inch diameter high tensile steel wire coated with bronze to enhance its bonding with rubber. Of course, depending upon the tire size other filament diameters could be used in practicing the invention. Each of the bead cores 11 has a radial cross-sectional shape which is substantially pentagonal. For example, in a tire of size LT 235/85R16, each of the bead cores may be fabricated having eight radially superposed layers of wraps of said single metallic filament. The number of wraps in each layer, beginning with the radially innermost layer being 4,5,6,5,4,3,2,1. For other sizes of tires, different numbers of layers, and wraps in each layer may be used.

A carcass ply 12 and a clamping member 18 are folded about each bead core 11. The carcass ply and clamping member are encased in suitable elastomeric compounds. Experiments to determine the best of practicing the present invention indicate that, depending upon the carcass ply material and exact cross-sectional bead shape, it may be desirable to interpose thin layer of a tough abrasion resistant rubber between the carcass ply and the pentagonal bead core, not to extend radially outwardly beyond the bead core. This layer of a tough abrasion resistant rubber is intended to prevent chafing of the cords of the carcass ply against any sharp edge of the bead core. A tire according to the best mode may have either a single carcass ply of aramid cords, as illustrated in FIGS. 2 and 3, or it may have a plurality of carcass plies of polyester cords. Of course, the combination of the number of carcass plies and cord material is dependent upon the operating parameters for a given tire. A tire according to the best mode has a clamping member comprising 1260/3 Nylon 6,6 cords spaced at nineteen cords per inch and oriented at 20° with respect to a plane which is parallel to the equatorial plane EP of the tire. The equatorial plane is a plane midway between the tire sidewalls and perpendicular to the axis of rotation of the tire. Both of the edges of the carcass ply 12 and clamping member 18 are wholly disposed radially inwardly of the specified outermost radius R of a rim 22 which is specified for use with the tire in the *YEAR BOOK OF THE TIRE AND RIM ASSOCIATION, INC.* for the year in which the tire is manufactured, or in the yearbook of the European Tyre & Rim Technical Organization for the year in which the tire is manufactured.

A stiffening member 19 comprising an elastomeric compound having a Shore D hardness of 40 or greater and a Young's Modulus of 3,400 pounds per square inch (p.s.i.) is located axially inwardly of the carcass ply and clamping member and extends from a radially inner end located radially inwardly of the bead core 11, to a radially outer end which is disposed radially outwardly of the specified outermost radius R of the rim flange of the rim designated for use with the tire. For example, in a tire of size LT 235/85R16, having a maximum section height A of about 7.8 inches, the axially inner stiffening member 19 extends radially outwardly a distance C of about 2 inches from the Sharp Diameter of the tire. The axially inner stiffening member 19 has a crescent-like cross section and serves to: reduce stresses in the lower sidewall of the tire upon deflection: forces the carcass ply to follow a more natural shaped path to reduce stresses; protects the bead from damage during mounting and demounting of the tire on a rim: and acts as a backing for the softer air-impervious innerliner 17 to help the innerliner retain thickness and shape during the tire assembly operation. The use of a stiffening member in the lower sidewall of a tire is known for example from U.S. Pat. No. 4,609,023.

An axially outer elastomeric stiffening member 20 comprising an elastomeric compound having a Shore D hardness of 40 or greater and a Young's Modulus of 3,400 pounds per square inch (p.s.i.) or greater is located axially outwardly of the carcass ply and clamping member and extends from a radially inner end located radially inwardly of the radially outermost extent of the bead core 11, to a radially outer end which is disposed radially outwardly of the axially inner stiffening member 19. For example, in a tire of size LT 235/85R16 the axially outer stiffening member extends radially outwardly a distance B of about 2.5 inches from the Sharp Diameter of the tire; or in other words about 0.5 inches further than the axially inner stiffening member. In a tire according to the best mode the axially inner and outer members 19, 20 are comprised of a single elastomeric compound. The axially outer stiffening member 20 aids in moving stress concentrations away from the edge of the carcass ply 12 and will hopefully aid in reducing failures due to separations of the tire components. A layer of sidewall rubber 16 is disposed axially outwardly of the carcass ply in the sidewall portion of the tire in the usual manner.

As used herein and in the appended claims "Young's Modulus" is a tensile property determined according to the following test procedure.

The apparatus used in this test procedure are:
(1) tension/compression tester;
(2) calipers (measuring to 0.001"); and
(3) a silver pen.

The parameters for the tension/compression tester are:
(1) A crosshead speed of 10"/minute (Tension),
(2) A chart speed of 10"/minute (Tension); and
(3) A full scale load of 100 pounds (Tension).

SAMPLE PREPARATION

For each compound prepare two 12"×1"×0.125" strips, and measuring from one end draw lines at 1", 5", 6" and 7" with a silver pen.

TEST PROCEDURE (a) Clamp the strip between the jaws of the upper plate such that the 1" line drawn on the specimen coincides with the lower edge of the jaws.
(b) Separate the bottom edge of the upper jaws and the top edge of the bottom jaws by 10" and clamp the remainder of the strip between the lower jaws, keeping the specimen as vertical as possible.
(c) Record the width and gauge of the specimen at the 5", 6", and 7" lines to 3 decimal places.
(d) While recording the force-deflection curve, pull the strip to 50% elongation (until the distance between the jaws is 15 inches).
(e) Return the crosshead until the jaws are again 10" apart.
(f) Repeat steps d and e two more times.
(g) Unclamp both ends of specimen and reposition the specimen such that the 6" line is now located 5" from both upper and lower jaws.
(h) Reclamp the specimen in this position; try to keep the specimen as vertical as possible.
(i) Remove slack from sample.
(j) Measure the conditioned width and gauge of the specimen at the 5", 6", and 7" lines to 3 decimal places immediately as the rubber will start contracting giving a higher (thicker) reading the longer you wait.
(k) While recording the force-deflection curve, pull the conditioned specimen to 50% elongation (until the distance between the jaws is 15 inches).
(l) Return the crosshead and remove the sample.
(m) Repeat steps a through 1 with the second sample.

DATA REDUCTION (a) Using the measured conditioned widths and gauges at the 5", 6", and 7" lines, calculate the cross-sectional area of the specimen at each line—width x gauge.

(b) Calculate the average of the cross-sectional areas at the 5", 6", and 7" lines. The calculated average will be called Ac, the conditioned cross-sectional area of the specimen.

(c) From the Force/Deflection curve, pick a set of corresponding Forces and Deflections. (F1, d1), (F2, d2), etc.

(d) The strain at each point is calculated by the expression:

$$E1 = \frac{d1}{10.0}, E2 = \frac{d2}{10.0}, \text{etc.}$$

Where: 10.0 is the gauge length of the specimen.

(e) The instantaneous cross-sectional area of each point is approximated by the relationship:

$$A1 = \frac{Ac}{1 + E1}, A2 = \frac{Ac}{1 + E2}, \text{etc.}$$

Where: Ac is the conditioned cross-sectional area.

(f) The stress at each point is calculated by the relationship:

$$1 = \frac{F1}{A1}, 2 = \frac{F2}{A2}, \text{etc.}$$

Where: F1 and F2 are taken from the Force/Deflection curve.

(g) Plot the corresponding values of Stress and Strain.

(h) The modulus of elasticity (Young's Modulus) is determined
by calculating the slope (STRESS) of the tangent to this (STRAIN)
curve at the value of strain of interest.

While certain representative embodiments and details have been shown for the purpose of illustrating the invention, it will be apparent to those skilled in the art that various changes and modifications may be made therein without deviating from the spirit or scope of the invention.

We claim:

1. A pneumatic tire comprising:
   (a) a pair of axially spaced apart annular bead cores, each bead core comprising a plurality of wraps of a single metallic filament, each bead core having a radial cross-sectional shape which is substantially pentagonal with the greatest axial width of the bead core being located radially outwardly of the radially innermost edge of the bead core, and with the radially outermost extent of the bead core being the vertex of two of the sides of said pentagon;
   (b) a carcass ply which is folded about each said bead core, said carcass ply having a main portion that extends between the bead cores and turn-up portions that are folded around the bead cores, a radially outer edge of each said turn-up portion being in contact with said main portion, wherein no bead filler or apex is interposed between the turn-up portion of the carcass ply and the main portion of the carcass ply radially outwardly of said bead core;
   (c) each said bead core having a clamping member folded thereabout, said clamping members each comprising a strip of side-by-side cords of a nonmetallic heat shrinkable material which has a permanent thermal shrinkage of at lest 2%, said cords being oriented in the range of 0° to 75° with respect to a plane perpendicular to the axis of rotation of the tire, each said clamping member being disposed directly adjacent to said carcass ply on the side of the carcass ply distal from said bead core from a location axially inwardly of the bead core to a location radially outwardly of the bead core and the turn-up portion of the carcass ply such that the respective turn-up portion of the carcass ply is radially interposed between and directly adjacent to both the clamping member and the bead core; each said turn-up portion of the carcass ply and each said clamping member being disposed radially inwardly of the specified outermost radius of the flange height of a rim which is specified for use with the tire in the *Year Book of the Tire and Rim Association Inc* for the year in which the tire is manufactured, said clamping members securing the turn-up portions of the carcass ply in position and protecting the carcass ply from damage; and
   (d) first and second elastomeric stiffening members associated with each bead core, one of said stiffening members being disposed axially inwardly of the carcass ply and clamping member and extending from a radially inner end located radially inwardly of the bead core to a radially outer end disposed radially outwardly of the bead core, the other elastomeric stiffening member being disposed axially outwardly of the carcass ply and clamping member and extending from a radially inner end located radially inwardly of the radially outermost extent of the bead core to a radially outer end which is disposed radially outwardly of the other stiffening member, each of said stiffening members comprising an elastomeric compound having a Shore D hardness of 40 or greater and a Young's Modulus of 3,400 pounds per square inch or greater.

2. A pneumatic tire according to claim 1, wherein said clamping members comprise cords of a heat shrinkable material selected from the group consisting of nylon 6 and nylon 6, 6.

3. A pneumatic tire according to claim 1 wherein the side-by-side cords of the clamping members are oriented in the range of 10° to 45° with respect to a plane perpendicular to the axis of rotation of the tire.

4. The pneumatic tire according to claim 2 wherein the side-by-side cords of the clamping members are oriented in the range of 10° to 45° with respect to a plane perpendicular to the axis of rotation of the tire.

5. A pneumatic tire according to any one of claims 1 to 4 wherein said axially inner and outer stiffening members comprise the same elastomeric compound.

6. An assembly comprising a pneumatic tire mounted upon a rim specified for use with the tire in the *Year Book of the Tire and Rim Association Inc* for the year in which the tire is manufactured, said rim having rim flanges and said tire comprising:
   (a) a pair of axially spaced apart annular bead cores, each bead core comprising a plurality of wraps of a single metallic filament, each bead core having a radial cross-sectional shape which is substantially pentagonal with the greatest axial width of the bead core being located radially outwardly of the radially innermost edge of the bead core, and with the radially outermost extent of the bead core being the vertex of two of the sides of said pentagon;

(b) a carcass ply which is folded about each said bead core, said carcass ply having a main portion that extends between the bead cores and turn-up portions that are folded around the bead cores, a radially outer edge of each said turn-up portion being in contact with said main portion, wherein no bead filler or apex is interposed between a turn-up portion of the carcass ply and the main portion of the carcass ply radially outwardly of said bead core;

(c) each said bead core having a clamping member folded thereabout, said clamping members each comprising strip of side-by-side cords of a nonmetallic heat shrinkable material which has a permanent thermal shrinkage of at least 2%, said cords being oriented in the range of 0° to 75° with respect to a plane perpendicular to the axis of rotation of said assembly, each said clamping member being disposed directly adjacent to said carcass ply on the side of the carcass ply distal from said bead core from a location axially inwardly of the bead core to a location radially outwardly of the bead core and the turn-up portion of the carcass ply, such that the respective turn-up portion of the carcass ply is radially interposed between and directly adjacent to both the clamping member and the bead core, each clamping member and turn-up portion of the carcass ply being disposed such that the turn-up portion and clamping member do not extend radially outwardly of said rim flanges, said clamping member securing the turn-up portions of the carcass ply in position and protecting the carcass ply form damage; and (d) first and second elastomeric stiffening members associated with each bead core, one of said stiffening members being disposed axially inwardly of the carcass ply and clamping member and extending from a radially inner end located radially inwardly of the bead core to a radially outer end disposed radially outwardly of the bead core, the other elastomeric stiffening member being disposed axially outwardly of the carcass ply and clamping member and extending from a radially inner end located radially inwardly of the radially outermost extent of the bead core to a radially outer end which is disposed radially outwardly of the other stiffening member, each of said stiffening members comprising an elastomeric compound having a Shore D hardness of 40 or greater and a Young's Modulus of 3,400 pounds per square inch or greater.

7. An assembly according to claim 6 wherein said clamping members comprise cords of a heat shrinkable material selected from the group consisting of nylon 6 and nylon 6,6.

8. An assembly according to claim 6 wherein the side-by-side cords of the clamping members are oriented in the range of 10° to 45° with respect to a plane perpendicular to the axis of rotation of the assembly.

9. An assembly according to claim 7 wherein the side-by-side cords of the clamping members are oriented in the range of 10° to 45° with respect to a plane perpendicular to the axis of rotation of the assembly.

10. An assembly according to any one of claims 6–9 wherein said axially inner and outer stiffening members comprise the same elastomeric compound.

11. A pneumatic tire comprising:

(a) a pair of axially spaced apart annular bead cores, each bead core comprising a plurality of wraps of a single metallic filament, each bead core having a radial cross-sectional shape which is substantially pentagonal with the greatest axial width of the bead core being located radially outwardly of the radially innermost edge of the bead core, and with the radially outermost extent of the bead core being the vertex of two of the sides of said pentagon;

(b) a carcass ply which is folded about each said bead core, said carcass ply having a main portion that extends between the bead cores and turn-up portions that are folded around the bead cores, a radially outer edge of each said turn-up portion being in contact with said main portion, wherein no bead filler or apex is interposed between the turn-up portion of the carcass ply and the main portion of the carcass ply radially outwardly of said bead core;

(c) each said bead core having a clamping member folded thereabout, said clamping members each comprising a strip of side-by-side cords of a nonmetallic heat shrinkable material which has a permanent thermal shrinkage of at least 2%, said cords being oriented int he range of 0° to 75° with respect to a plane perpendicular to the axis of rotation of the tire, each said clamping member being disposed directly adjacent to said carcass ply on the side of the carcass ply distal from said bead core from a location axially inwardly of the bead core to a location radially outwardly of the bead core and the turn-up portion of the carcass ply such that the respective turn-up portion of the carcass ply is radially interposed between and directly adjacent to both the clamping member and the bead core; each said turn-up portion of the carcass ply and each said clamping member being disposed radially inwardly of the specified outermost radius of the flange height of a rim which is specified for use with the tire in the Year Book of the Tire and Rim Association Inc for the year in which the tire is manufactured, said clamping members securing the turn-up portions of the carcass ply in position and protecting the carcass ply from damage.

12. A pneumatic tire according to claim 11, wherein said clamping members comprise cords of a heat shrinkable material selected from the group consisting of nylon 6 and nylon 6,6.

13. A pneumatic tire according to claim 11 wherein the side-by-side cords of the clamping members are oriented in the range of 10° to 45° with respect to a plane perpendicular to the axis of rotation of the tire.

14. A pneumatic tire according to claim 12 wherein the side-by-side cords of the clamping members are oriented in the range of 10° to 45° with respect to a plane perpendicular to the axis of rotation of the tire.

15. An assembly comprising a pneumatic tire mounted upon a rim specified for use with the tire in the Yearbook of the Tire and Rim Association Inc. for the year in which the tire is manufactured, said rim having rim flanges and said tire comprising:

(a) a pair of axially spaced apart annular bead cores, each bead core comprising a plurality of wraps of a single metallic filament, each bead core having a radial cross-sectional shape which is substantially pentagonal with the greatest axial width of the bead core being located radially outwardly of the radially innermost edge of the bead core, and with the radially outermost extent of the bead core being the vertex of two of the sides of said pentagon;

(b) a carcass ply which is folded about each said bead core, said carcass ply having a main portion that extends between the bead cores and turn-up portions that are folded around the bead cores, a radially outer edge of each said turn-up portion being in contact with said main portion, wherein no bead filler or apex is interposed between a turn-up portion of the carcass ply and the main portion of the carcass ply radially outwardly of said bead core; and (c) each said bead core having a clamping member folded thereabout, said clamping members each comprising a strip of side-by-side cords of a nonmetallic heat shrinkable material which has a permanent thermal shrinkage of at least 2%, said cords being oriented int he range of 0° to 75° with respect to a plane perpendicular to the axis of rotation of said assembly, each said clamping member being disposed directly adjacent to said carcass ply on the side of the carcass ply distal from said bead core from a location axially inwardly of the bead core to a location radially outwardly of the bead core and the turn-up portion of the carcass ply, such that the respective turn-up portion of the carcass ply is radially interposed between and directly adjacent to both the clamping member and the bead core, each clamping member and turn-up portion of the carcass ply being disposed such that the turn-up portion and clamping member do not extend radially outwardly of said rim flanges, said clamping members securing the turn-up portions of the carcass ply in position and protecting the carcass ply from damage.

16. An assembly according to claim 15 wherein said clamping members comprise cords of a heat shrinkable material selected from the group consisting of nylon 6 and nylon 6,6.

17. An assembly according to claim 15 wherein the side-by-side cords of the clamping members are oriented in the range of 10° to 45° with respect to a plane perpendicular to the axis of rotation of the assembly.

18. An assembly according to claim 16 wherein the side-by-side cords of the clamping members are oriented in the range of 10° to 45° with respect to a plane perpendicular to the axis of rotation of the assembly.

19. The pneumatic tire according to claim 1 wherein the turns of said plurality of wraps in oriented in a 4, 5, 6, 5, 4, 3, 2, 1 configuration.

20. An assembly according to claim 11 wherein the turns of said plurality of wraps is oriented in a 4,5,6,5,4,3,2,1 configuration. being located radially outwardly of the radially innermost edge of the bead core, and with the radially outermost extent of the bead core being the vertex of two of the sides of said pentagon.

* * * * *